US 8,043,648 B2

United States Patent
Edelman et al.

(10) Patent No.: US 8,043,648 B2
(45) Date of Patent: Oct. 25, 2011

(54) EDIBLE EMULSIONS WITH MINERAL

(75) Inventors: Marijke Willemien Edelman, Vlaardingen (NL); Eckhard Flöter, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 609 days.

(21) Appl. No.: 12/082,828

(22) Filed: Apr. 15, 2008

(65) Prior Publication Data

US 2008/0254193 A1  Oct. 16, 2008

(30) Foreign Application Priority Data

Apr. 16, 2007 (EP) .................................. 07106208

(51) Int. Cl.
*A23D 7/00* (2006.01)
*A23L 1/304* (2006.01)

(52) U.S. Cl. .......................................... 426/602; 426/74

(58) Field of Classification Search .......... 426/602–604, 426/74
See application file for complete search history.

(56) References Cited

U.S. PATENT DOCUMENTS

| 6,472,003 B2 * | 10/2002 | Barrett-Reis et al. | 426/72 |
| 2003/0118695 A1 * | 6/2003 | Castenmiller | 426/74 |

FOREIGN PATENT DOCUMENTS

| EP | 0914779 A2 | 5/1999 |
| EP | 1810658 A2 | 7/2007 |
| WO | WO 00/54838 * | 3/2000 |
| WO | WO 01/17375 * | 3/2001 |
| WO | WO 03/034832 A1 | 5/2003 |
| WO | WO 2005/102065 A1 | 11/2005 |

OTHER PUBLICATIONS

European Search Report Application No. 07106208 dated Feb. 22, 2008.
Goudappel et al., "Measurement of Oil Droplet Size Distributions in Food Oil/Water Emulsions by Time Domain Pulsed Field Gradient NMR", Journal of Colloid and Interface Science, 239, pp. 535-542, 2001.
Derwent abstract of East German patent DD 238720, Sep. 1986.
Alderliesten, Mean Particle Diameters. Part I: Evaluation of Definition Systems, VCH Verlagsgesellschaft mbH, Part. Part. Syst. Charact., 1990, pp. 233-241.
Alderliesten, Mean Particle Diameters Part II: Standardization of Nomenclature, VCH Verlagsgellschaft mbH, Part. Part. Syst Charact. 8, 1991, pp. 237-241.
Communication pursuant to Article 94(3) EPC for Application No. 08 718 174.9 dated Dec. 28, 2010.
http://www.greenpeace.de/fileadmin/god/user_upload/themen/landwirtschaft/greenpeace_butter_omega3.pdf, Sep. 1986. 2 pages.
http://fr.wikipedia.org/wiki/beurre, 12 pages (with English translation).
Van Zijl et al., Yellow Fat Products (Butter, Margarine, Dairy and nondairy Spreads), The microbiological safety and quality of food, 2000, vol. 2, Chapter 29. pp. 784-835, Lund & Al., Aspen Publishers, Gaithersburg, MD.

* cited by examiner

*Primary Examiner* — Carolyn Paden
(74) *Attorney, Agent, or Firm* — Michael P. Aronson

(57) ABSTRACT

Edible water-in-oil emulsion comprising a source of mineral and 15 to 95 wt % fat, wherein the mineral is present in the aqueous phase and wherein the mineral is in-homogenously distributed over the aqueous phase and a process for making such an emulsion.

18 Claims, No Drawings

EDIBLE EMULSIONS WITH MINERAL

FIELD OF THE INVENTION

The invention relates to an edible emulsion comprising a source of mineral.

BACKGROUND TO THE INVENTION

Dietary or essential minerals are chemical elements required by living organisms, other than the four elements carbon, hydrogen, nitrogen, and oxygen which are ubiquitous in organic molecules. They can be either bulk minerals (required in relatively large amounts) or trace minerals (required only in very small amounts).

These can be naturally occurring in food or added in elemental or mineral form, such as calcium carbonate or sodium chloride. Some of these additives come from natural sources such as ground oyster shells. Sometimes minerals are added to the diet separately from food, as vitamin and mineral supplements. Appropriate intake levels of each dietary mineral must be sustained to maintain physical health.

In Human nutrition, the dietary bulk mineral elements (RDA >200 mg/day) are calcium, magnesium, phosphorus, potassium, sodium, and sulphur.

The most important trace mineral elements (RDA <200 mg/day) are chromium, cobalt, copper, fluorine, iodine, iron, manganese, molybdenum, selenium, and zinc.

Many other minerals have been suggested as required in human nutrition, in varying quantities, such as bismuth, boron, nickel, rubidium, silicon, strontium, tellurium, titanium, tungsten, and vanadium.

A large body of research suggests that humans often can benefit from mineral supplementation. Metals, like iron, magnesium, zinc, selenium and calcium are essential minerals.

Edible emulsions are used in a variety of ways, e.g. spreadable products, frying products, baking ingredients, drinks, diary type products. They are therefore suitable vehicles for incorporation of minerals.

Unfortunately many of these minerals have a bitter taste or metallic taste and the amount of the minerals needed in food products to fortify in order to obtain a beneficial effect from it gives the food product an off-taste which is not liked by consumers. Sometimes the mineral interacts with another ingredient in a food product which results in an unpleasant taste. Fat oxidation is a well-known example giving an unpleasant off-taste.

One option is to encapsulate the minerals, like in multi-vitamin and -mineral pills to prevent the contact of the mineral with the mouth or other ingredients. A drawback of the encapsulation is that a suitable encapsulate should be found that works well in the food product. In addition, the encapsulate needs to release the mineral at a certain time after consumption such that the mineral is available to the human body. Another drawback is that encapsulates are often more expensive than the bare ingredient it self.

Another way of masking the bad taste of mineral is to add another taste that overtakes the bitter taste. However often a lot of the masking taste should be added to mask the undesired taste and not much flexibility in taste is left, and another strong taste is left, which leaves out neutral tasting food products.

German patent DD 238 720 describes stable food emulsion, both fat- and water-continuous, such as mayonnaise and margarine, with a stabilised interphase. The stabilisation of the interphase of the water and fat phase is obtained by the addition of multivalent cations. The multivalent cations may added while an emulsion is made or thereafter. The examples show addition of the cation in either the water-phase (example 1), so before an emulsion is made, and postdosing the cation in a water-continuous emulsion (example 2-4). No disclosure is made of adding cations in a fat-continuous emulsion.

European patent application EP 1 810 658 discloses cosmetic compositions comprising dispersed aqueous colloidal particles from charged minerals. The composition may be amongst others a gel, aqueous, oily or an emulsion, either water-continuous or fat-continuous. The examples disclose postdosing the colloidal mineral containing particles into a water-continuous emulsion. No disclosure is made of postdosing the colloidal mineral containing particles in a fat-continuous emulsion.

WO03/034832 discloses edible water-in-oil emulsions with calcium. The calcium is dosed in the water phase.

EP 0 914 779 discloses protein containing acidic foods and drinks. The foods and drinks are water-continuous emulsions with a fat content of 0.1-10 wt %. Electrolytes may be added to the emulsion after the emulsion is made.

WO2005/102065 discloses a process for manufacturing a thermo-resistant, thermo-irreversible gel. The final texture of the gel is fixed by adding salt into it.

It is therefore an object of the current invention to provide a food product which comprises a mineral wherein the undesired taste of the mineral is not noticed by consumers. Another object of the invention is to provide a food product which is stable under storage at ambient and higher temperatures. Further food products with good organoleptic properties are envisioned with the current invention. Another object is to provide a food product that provides at least a part of the recommended daily amount (RDA) of minerals per serving. Another object of the present invention is to provide a food product that provides at least a part of the recommended daily amount (RDA) of minerals per serving for improved mental health. Yet another object of the present invention is to provide a food product that provides at least a part of the recommended daily amount (RDA) of minerals per serving for blood pressure lowering.

SUMMARY OF THE INVENTION

One or more of the above objects are attained by an edible water-in-oil emulsion comprising a mineral and 15 to 95 wt % fat wherein the mineral is present in the aqueous phase and wherein the mineral is in-homogenously distributed over the aqueous phase.

It was surprisingly found that emulsions wherein the mineral is distributed in-homogenously in the aqueous phase do not have the taste of the mineral or develop an off-taste.

DETAILED DESCRIPTION OF THE INVENTION

The mineral according to the invention is distributed in-homogenously over the aqueous phase. Distributed in-homogenously means that when looking at the water droplets in the emulsion, the amount of mineral in one water droplet differs from the amount of mineral in another water-droplet. In contrast in a homogenous distribution every water droplet would contain approximately the same amount of mineral, and thus the difference between a waterdroplet containing the least amount of mineral and the waterdroplet containing the largest amount of mineral is small, e.g. less than 10% or even less than 5% of difference. In an in-homogenous distribution the difference between the water-droplet containing the least amount of mineral and the water-droplet containing the most amount mineral is large. Preferably the difference in amount of mineral in the water-droplets in an in-homogenous distribution is more than 10%, more preferably more than 25%, even more preferably more than 50%. Another way to differentiate between homogenous and in-homogenous distribution is by plotting the distribution of the amount or concentration of minerals per water-droplet. A homogenous distribution would lead to a unimodal or Gaussian distribution, while an in-homogenous distribution would lead to a bi-modal or multi-modal distribution. A homogenous distribution will also show one population of amounts or concentration of mineral in the water-droplet, while in contrast, a in-homogenous distribution will show more than 1 population.

Dosing in the water-phase, fat-phase or a water-continuous emulsion and normal processing gives a homogenous distribution (see examples).

The experimental section of the present invention provides a way of determining the mineral amount and distribution of a specific sample of the emulsion.

Preferably the amount of mineral is the same in each serving size. Suitably iron-containing water droplets are evenly distributed over the fat-phase. It should be stressed that the inhomogenous distribution is over the water-phase. Preferably the distribution over the total emulsion is homogenous.

The serving size depends on the purpose of the edible emulsion or the food product. Suitable daily serving sizes are 10 to 50 g, more preferably about 20 to 30 g for spreads. It is also possible to divide the daily amount into 2 to 10 servings. Suitable single serving sizes are for spread 3 to 8 g, more suitably 5 to 6 g. The dividing of the daily serving into several single servings has the advantage that the intake may be distributed over the whole day and that the consumer may vary with different product formats to obtain his optimal intake of the nutrients. For example, the total intake of the composition of the invention may come from 4 bread slices covered each with 5 g of spread.

The amount of mineral depends on the amount needed for an effect to be obtained and on the quantity of a serving size and on the product type and can be determined by the skilled person. The amount of mineral is the amount of mineral ion and not the salt. Different salts of the mineral therefore need different amounts of salts. Preferably, the amount is 10 to 200% of the recommended daily amount (RDA) of the mineral per serving, preferably 20 to 150%, more preferably 30 to 120%, most preferably, 30 to 60%. Suitable amounts are 15, 50, 70 and 100% of the RDA. The recommended daily value for this invention are the RDA from the EU.

For example the RDA of iron is 14 mg, this means that 56 mg of ferric pyrophosphate is needed to provide 14 mg of iron.

The present invention is especially suited for pro-oxidative minerals. These are minerals that promote oxidation. In particular the oxidation fats, especially unsaturated fatty acids, also known as rancidification, is detrimental in food products as it gives an unpleasant fishy flavour. Transition metals are known pro-oxidants for lipid oxidation, as are cationic metals, especially in the oxidation state of 2+ or 3+. Especially known pro-oxidant metals in lipid oxidation are copper, iron, and cobalt. Preferably the pro-oxidative mineral is present in an amount wherein the pro-oxidative mineral gives an unpleasant taste to the emulsion when the pro-oxidative mineral is homogenously distributed over the aqueous phase. The unpleasant taste may come from the mineral itself or from flavours developed by interaction of the mineral with other ingredients of the emulsion.

Another preferred embodiment comprises edible water-in-oil emulsion comprising a mineral and 15 to 95 wt % fat wherein the mineral is present in the aqueous phase and wherein the mineral is in-homogenously distributed over the aqueous phase and wherein the mineral gives an unpleasant taste to the emulsion when the mineral is homogenously distributed over the aqueous phase. Preferably the mineral is present in an amount wherein the mineral gives an unpleasant taste to the emulsion when the mineral is homogenously distributed over the aqueous phase. The unpleasant taste may come from the mineral itself or from flavours developed by interaction of the mineral with other ingredients of the emulsion.

An unpleasant taste may be selected from the group comprising bitter taste, rancid taste, off-flavour taste, metallic taste, old taste, offensive taste, fishy taste, and fat-oxidation taste. A preferred unpleasant taste is metallic taste. Another preferred unpleasant taste is a rancid taste, a fishy taste or a fat-oxidation taste.

Another preferred embodiment comprises edible water-in-oil emulsion comprising a mineral and 15 to 95 wt % fat wherein the mineral is present in the aqueous phase and wherein the mineral is in-homogenously distributed over the aqueous phase and wherein the mineral gives an unpleasant taste to the emulsion when the mineral is homogenously distributed over the aqueous phase and wherein the unpleasant taste is noticed after 15 weeks or less of storage at 10° C., more preferably after 10 weeks or less of storage at 10° C., more preferably after 5 weeks or less of storage at 10° C. and most preferably after 2-3 weeks or less of storage at 10° C.

Taste or flavour of the emulsion is determined by a sensory panel. Sensory panels consist of trained human assessors that qualify and quantify sensory properties of foods. The responses made by the sensory panels are recorded and may be analysed by statistical methods e.g. ANOVA, multivariate or univariate data analyses. Within food research, sensory panels are commonly used to qualify and quantify sensory properties, such as taste, odour or smell, flavour, mouthfeel, and other organoleptic properties. The type of sensory panel will depend on the taste of the tasty ingredient and the product format, however these consideration are all within the skills of a skilled person.

Suitable minerals according to the invention are calcium, magnesium, phosphorus, potassium, sodium, and sulfur, chromium, cobalt, copper, fluorine, iodine, iron, manganese, molybdenum, selenium, zinc, or any combination thereof.

Another preferred embodiment comprises edible water-in-oil emulsion comprising a mineral and 15 to 95 wt % fat wherein the mineral provides a health benefit.

Many healthy minerals need a certain doses in order to give a health benefit, the so-called effective amount. Often these effective amounts are high thereby increasing the undesired taste to the edible emulsion they are in. The present invention is specifically suited for healthy minerals in effective amounts.

Preferably the effective amount of the healthy mineral is such that it would give a health benefit in a daily serving size of the emulsion.

In a suitable embodiment of the present invention, the mineral provides a health effect. Preferably the health effect is selected from the group comprising reduction of risk for cardiovascular disease, reduction of blood pressure, reduction of blood cholesterol, increased resistance to disease, improved immune response, improved brain function, improved brain development, improved mental performance, weight loss, weight control, reduction of Body Mass Index (BMI), improved blood flow, lowering plasma triglycerides, anti-inflammatory effect, antirheumatic effect, smooth platelets, inhibition of platelet aggregation, antithrombotic effect and healthy growth for children. Preferred health effects are increased resistance to disease, improved immune response, improved brain function, improved brain development, improved mental performance, and healthy growth for children.

Preferred minerals are iron, magnesium, zinc iodine, manganese and selenium. These minerals are beneficial for mental performance. More preferred minerals are iron, zinc and magnesium with iron and zinc being most preferred.

Calcium is also a preferred mineral as it is vital for bone growth and maintenance.

| Mineral | RDA (mg) EU |
|---|---|
| iron | 14 |
| iodine | 0.150 |
| zinc | 15 |
| calcium | 800 |
| phosphorus | 800 |
| magnesium | 300 |
| selenium | 0.010 |

Suitable sources of mineral are food-grade mineral sources.

Suitable iron sources are ferrous carbonate, ferrous citrate, ferrous ammonium citrate, ferrous gluconate, ferrous fumarate, ferric sodium diphosphate, ferrous lactate, ferrous sulphate, ferric diphosphate, ferric pyrophosphate, ferric saccharate, ferrous EDTA, ferric EDTA, ferrous diglycinate, ferric triglycinate, iron oxide, iron phosphate and elemental iron.

Suitable magnesium sources are magnesium acetate, magnesium carbonate, magnesium chloride, magnesium salts of citric acid, magnesium gluconate, magnesium glycerophosphate, magnesium salts of orthophosphoric acid, magnesium lactate, magnesium hydroxide, magnesium oxide, magnesium sulphate.

Suitable zinc sources are zinc acetate, zinc chloride, zinc citrate, zinc gluconate, zinc lactate, zinc oxide, zinc carbonate, zinc sulphate.

Suitable selenium sources are sodium selenate, sodium hydrogen selenite and sodium selenite.

Suitable sources of calcium are calcium carbonate, calcium chloride, calcium salts of citric acid, calcium gluconate, calcium glycerophosphate, calcium lactate, calcium salts of orthophosphoric acid, calcium hydroxide, calcium oxide, calcium sulphate.

Preferably the mineral is not in the form of colloidal particles. Preferably the mineral is not table salt or sodium chloride. Preferably the mineral is not encapsulated or at least a part of the mineral is not encapsulated. Preferably at least 20 wt % of the mineral is not encapsulated, more preferably 30-100 wt %, more preferably 50-100 wt % and most preferably 80-100 wt % of the mineral is not encapsulated.

In a preferred embodiment the emulsion is not a duplex emulsion.

The emulsion of the invention may comprise thickeners. For stability reasons it may be useful to include thickeners in the emulsion, for example very low spreads, having 20 to 30 wt % of fat, often improve by addition of thickeners. Whether or not a thickener should be added and in what amount depends on factors as stability and application and may be determined by the skilled person.

Thickener may be any known thickener and are preferably selected from the group comprising gums, like xanthan, guar, and locust bean, carrageenan, polysaccharides, alginate, pectin, starch, and gelatine.

In preferred emulsions according to the invention, the aqueous phase comprises a fully gelatinised starch selected from any of the main starch groups: wheat, potato, tapioca, rice, maize, waxy rice or waxy maize.

The amount of starch in the emulsion according to the invention depends somewhat on the type of chosen starch and is preferably from 0.2 to 5 wt %, more preferred from 0.7 to 3 wt %, most preferred from 1 to 2 wt %.

To ensure homogeneous distribution of the aqueous phase in the continuous fat phase, the droplet size distribution $D_{3,3}$ of the dispersed aqueous phase is preferably less than 8 μm, more preferably from 4 to 8 μm, more preferred even lower than 4 μm. The method to determine $D_{3,3}$ is illustrated in the examples. It will be appreciated that the droplet size can be controlled by adjusting the processing conditions in the unit operations: e.g. higher rotational speed in a scraped surface heat exchanger will produce correspondingly smaller water droplet size distributions.

The emulsion according to the invention comprises from 15 to 95 wt % of a fat, preferably from 15 to 60 most preferably from 20 to 50 wt %. For spreads the amount of fat is preferably from 20 to 60 wt % and more preferably from 30 to 40 wt %.

The fat can be a single fat or a combination of fats. The fat or combination of fats is selected such that the solid fat content is below 6% at 35° C., preferably below 5% at 35° C., more preferred below 4% at 35° C., most preferred from 2 to 4% at 35° C. The method to determine solid fat content is described in the examples.

If products are desired that are storage stable at lower temperatures of storage, which still show good melting properties upon consumption, the solid fat content is preferably below 6% at the desired storage temperature. Therefore in an alternative embodiment, the invention relates to food products wherein the solid fat content of the fat or fat blend is below 6 wt % at a temperature at or above 20° C., more preferred at or above 25° C.

The fat or fat blend may comprise vegetable or animal fats which may be hydrogenated, interesterified or fractionated. Suitable animal fats may consist of butterfat or tallow. Suitable vegetable fats can for example be selected from the group comprising bean oil, sunflower oil, palm kernel oil, coconut oil, palm oil, rapeseed oil, cotton seed oil, maize oil, or their fractions, or a combination thereof. Interesterified fat blends of these fats or optionally with other fats are also encompassed in the invention.

Preferred emulsions comprise poly-unsaturated fatty acids (PUFA). Preferred PUFA omega-3 and omega-6 fatty acids, such as alpha linoleic acid (ALA) DHA and EPA. Preferred PUFA are long chain PUFA. Suitable sources of long chain omega-3 fatty acids are fish oil and algae oil. Preferably the other fats in the fat phase are mainly vegetable. Preferably the fat phase comprises at least 25 wt % vegetable fat, more preferably at least 50 wt % vegetable fat.

In a preferred embodiment at least 20 wt % of the fat are polyunsaturated fats, more preferred at least 30 wt % and even more preferred more than 40 wt % and most preferred more than 50 wt % of the fat is polyunsaturated.

Preferably at least 2 wt % of the fat of the edible emulsion of this invention are omega-3 fatty acids, more preferably at least 5 wt %, most preferably at least 10 wt %. In a preferred embodiment the edible emulsion of the invention comprises 2-40 wt %, even more preferred 5-30 wt %, and most preferred 7-20 wt % omega-3 fatty acids on fat.

Suitably at least 0.3 wt % of the fat of the edible emulsion of this invention are DHA and/or EPA fatty acids, more suitably more than 1 wt %, most suitably more than 2 wt %. Suitably the edible emulsion of the present invention comprises 0.5-25 wt % of EPA and/or DHA fatty acids on fat level, preferably 1-15 wt %, more preferably 2-10 wt % and most preferably 3-7 wt %.

Suitable embodiments according to the invention provide an emulsion wherein at least 30 mg of EPA and DHA is present in a daily serving size. More suitable at least 100 mg and even at least 500 mg of EPA and/or DHA is present in a daily serving size. A most suitable embodiment provides an emulsion having 30 to 1500 mg, preferably 50-1000 mg, more preferably 150-500 mg, and most preferably 200-300 mg of DHA and/or EPA present in a daily serving size.

In addition, the emulsion according to the invention comprises an emulsifier. The emulsifier is preferably a water-in-oil emulsifier, preferably selected from the group comprising distilled monoglycerides, citric acid esters of monoglycerides, di-acetyl acetic acid esters of monoglycerides, lactic acid esters of monoglyceride, mono-diglycerides, polyglycerol esters of fatty acids or sorbitan esters of fatty acids.

The pH of the aqueous phase can be set to the desired value, among others to influence acidic or basic taste impression and to influence microbial stability. Preferably the pH of the aqueous phase in food products according to the invention is from 4.3 to 5.5.

Optionally some protein is added to the emulsion according to the invention. Protein may be added to beneficially influence the taste, flavour and nutritional value of the emulsion and also may be added to increase browning of food stuff when the current composition is used as a medium for shallow frying.

The emulsion according to the invention optionally contains other ingredients such as preservatives, vitamins, taste and flavour components, colorants such as beta-carotene, anti-oxidants.

The emulsion according to the invention can be prepared by any suitable process to prepare such products provided the mineral is in-homogenously distributed over the aqueous phase.

A suitable process according to the invention comprises
a) preparation of an aqueous phase comprising water soluble ingredients but not the mineral
b) preparation of a fat phase with fat soluble ingredients
c) mixing the aqueous phase and fat phase
d) forming a water-in-oil emulsion
e) mixing in the mineral after the water-in-oil emulsion is formed For example the preparation of a food product according to the invention comprises the preparation of an aqueous phase prepared comprising starch and water and other water soluble ingredients, which aqueous phase is heated to a temperature from 60 to 95° C. for at least 15 minutes to gelatinise the starch such that at least 50% is gelatinised, and subsequently cooled to a temperature of from 50 to 70° C., and separately a fat phase is prepared comprising fat phase ingredients at a temperature of around 60° C. and in a further step the aqueous phase and the fat phase are mixed at a temperature around 60° C. After the water-in-oil emulsion is formed a mineral is added and mixed in the pre-formed emulsion.

For some products first a water-continuous emulsion is made which is subsequently inverted into a fat-continuous emulsion by e.g. pins-stirrers or C-units. Also in these cases the mineral is mixed after the water-in-oil emulsions is formed, i.e. after the inversion.

The mixing is suitably performed by a hand-mixer, a static mixer or a C-unit or pin-stirrer in a votator line. Preferably the mixing is performed at a speed below 500 rpm, preferably below 300 rpm.

EXPERIMENTAL

Storage Stability Test

Food product was stored in a plastic container at 5, 10, 15, and 25° C. for up to 24 weeks. After storage the taste of each sample was tasted by a panel of at least 3 people. The panel judged the taste of the mineral (metallic taste) and other off-taste such as fish-taste for fat-oxidation.

$D_{3,3}$ Value Measurements and E-Sigma:

Samples were filled to a height of 15 mm in NMR tubes of 10 mm diameter, and thermally equilibrated for 30 min at 20° C. A restricted diffusion-based droplet size was obtained by means of pfg-NMR using a Bruker Minispec MQ20. The details of the technique are discussed by Goudappel et al (Journal of Colloid and Interface Science 239, (2001) 535-542). A measurement yields values for the volume weighted geometric mean diameter $d_{3,3}$ and the width of the droplet size distribution when plotted as a function of the logarithm of the diameter σ (E-sigma). Measurements were carried out in triplicate and results are expressed in terms of average $d_{3,3}$ values. Definitions of droplet sizes are given by Alderliesten (Particle and Particle Systems Characterization 7 (1990) 233-241, and ibid 8 (1991) 237-241).

Method to Determine Solid Fat Content

The solid fat content can be measured by a suitable analytical method such as NMR. The method used is low resolution NMR with Bruker Minispec apparatus. Reference is made to the Bruker minispec application notes 4, 5 and 6.

The percentage of solid fat determined by the low resolution NMR technique is defined as the ratio of the response obtained from the hydrogen nuclei in the solid phase and the response arising from all the hydrogen nuclei in the sample. The product of this ratio and one hundred is termed the low resolution NMR solids percent. No correction is made for variations in the proton density between solid and liquid phase. The NMR solids percent for a sample measured at t ° C. was given the symbol $N_t$.

Suitable instruments adapted to determine the solids fat content are the Bruker Minispecs p20i™, pc20™, pc120™, pc120s™, NMS120™ and MQ20™.

Stabilization and tempering procedure was as follows:
melt fat at 80° C.
5 minutes at 60° C.
60 minutes at 0° C.
30-35 minutes at each chosen measuring temperature.

Measurements of Iron in Samples:

Small quantities of about 1 µl spread were frozen in liquid ethane. The samples were freeze-fractured, to reveal the internal structure and transferred into a Scanning Electron Microscope (SEM) at −125° C.

A thin layer of gold/palladium was added on top of the fractured surface to obtain contrast in the SEM. The voltage of the SEM was 15 kV. The BackScattered Electron (BSE) detector was used to obtain mass contrast in the sample. This resulted in a dark appearance of the oil phase, a grey appearance of the water phase, and a bright white appearance of the iron particles.

Loose particles (debris) on top of the fractured surface also appear as bright dots, however, the debris can easily be distinguished from the iron particles, both by their 'on top' location (not embedded in the fractured sample) and by their elemental composition (not iron, often ice or gold).

Once a candidate iron particle has been found, it was photographed and analysed using Energy Dispersive X-ray micro analysis (EDX). The EDX method distinguishes the iron particles without doubt from any other particles, because of the clear iron spectrum. The EDX spectrum can also be used to determine whether the phase around the iron particle consists of water or oil, because water has a high Oxygen to Carbon ratio, while oil is higher in Carbon.

Examples 1-4

Ingredients are listed in table 1

Table 1; ingredients in wt %

TABLE 1

| ingredients in wt % | |
|---|---|
| Fat blend | 36.043 |
| Fish oil concentrate | 2.53 |
| Dimodan HP (monoglycerides) | 0.2 |
| Solec m (lecithin) | 0.15 |
| Covi-ox (tocopherol mixture) | 0.042 |
| DL-α-tocopherol acetate | 0.02 |
| Vitamin premixes (vitamin A, D, flavours) | 0.015 |
| Demi water | 56.601 |
| Tapioca starch | 3.25 |
| Yoghurt powder | 0.6 |
| Sodium chloride | 0.3 |
| Potassium sorbate | 0.12 |
| Flavour | 0.025 |
| Na$_2$CaEDTA | 0.01 |
| Vitamin premixes (vit, B1, B6, B11, B12) | 0.01 |
| Ferric pyrophosphate | 0.084 |
| Total [%] | 100 |

Used Fat Blend:

32% interesterified mixture of palm oil and palm kernel

43% linseed/linola oil

11% maize oil

12% soy bean oil

2% rapeseed oil

Fishoil concentrate provides 150 mg of EPA and DHA per 20 g of spread. Amount of iron provides 4.2 mg (30% of RDA) in 20 g of spread.

Processing

In a vessel a mixture was prepared of the fat, monoglyceride, antioxidant, and colorant at a temperature of about 60° C. In another, separate vessel a mixture was made of starch and water which was heated to a temperature of 92° C. for 25 minutes. This mixture was cooled to 60° C. and subsequently mixed with the oil phase in a pre-mix tank at 60° C. resulting in a water-continuous premix. This is then followed by cooling and shearing in a series of A- and C-units, in the configuration AAACC (A1A2A3C*C2) wherein A designates a scraped surface heat exchanger, and C designates a pen stirred crystallizer. The A-units consist of a stainless steel cylinder cooled at the outer surface with ammonia. The A-units are equipped with a rotor axis on which 2 rows of 2 stainless steel scraper blades are mounted. The rotation and type of emulsion are given in table 2.

In the premix tank and the A-units the emulsion is water-continuous. In the first C*-unit inversion takes place, such that in the C2-unit the emulsion is oil-continuous.

TABLE 2

| Processing parameters | | |
|---|---|---|
| Unit | rpm | Conductivity |
| A1 | 1000 | O/W |
| A2 | 1000 | O/W |
| A3 | 1000 | O/W |
| C* | 1800 | In O/W |
| | | Out W/O |
| C2 | 250 | W/O |

The iron pyrophosphate is dosed in the aqueous phase (example 1), fat phase (example 2), in the water-continuous premix (example 3) and mixed after the forming of the fat continuous emulsion (after C2 unit) with a hand mixer (Hobart) (example 4).

TABLE 3

| results of location of iron with different dosing regime | |
|---|---|
| Mixing of iron | Location of iron |
| Ex 1 aqueous phase | Iron particles are found in water droplets; Iron is homogenously distributed over aqueous phase* |
| Ex 2 Fat phase | Iron particles are not found in water droplets but in space between water droplets |
| Ex 3 premix | Iron particles are found in water droplets; Iron is homogenously distributed over aqueous phase* |
| Ex 4 Post dosed; hand mixed | Iron particles are found in water droplets; different water droplets contain different amounts of iron** |

*the amount of iron is less than the amount of water droplets. Therefore some water droplets contain 1 iron particle and some water droplets contain no iron particles.
**Water droplets that contain iron contain more than one iron particle in contrast to iron mixed in the aqueous phase and the premix (see also *).

Mixing iron in the fat-phase gives an emulsion wherein the iron is located in the fat-phase. Mixing in the aqueous phase or water-continuous premix gives an emulsion wherein the iron is located in the water-droplets, and each water-droplet has the same amount of iron. However, the mixing of the iron after the forming of the water-in-oil emulsion gives a different iron distribution; iron is located in the water-droplets, however some water-droplets contain much more iron than other water-droplets.

Tasting:

Taste of the samples is determined by a sensory panel. Samples are stored directly after processing at 5, 10, 15 and 25° C.; Samples are tasted each week, starting with the sample stored at 25° C. As soon as the 25° C. sample is judged OFF (metallic, fishy, oxidation, or rancid) the sample stored at a lower temperature is tasted. This is repeated until the sample stored at 5° C. is judged OFF or a shelf life of 24 weeks is reached.

When the iron is added via the aqueous phase (example 1) or the fat phase (example 2) a metallic taste was observed for the spread.

It was also checked for the development of a fish-taste over time.

TABLE 4 results of storage tests different dosing; 30% RDA iron.

| CONTENT | | 5° C. | 10° C. | 15° C. | 25° C. |
|---|---|---|---|---|---|
| aqueous phase | Ex 1 | 14 | 10 | 3 | 1 |
| Fat phase | Ex 2 | 2 | 1 | 1 | 1 |
| premix | Ex 3 | 17 | 12 | 3 | 1 |
| Post dosed; hand mixed | Ex 4 | 24 | 24 | 23 | NM* |

Off taste observed after indicated number of weeks of storage at indicated temperature. *NM: not measured.

When the iron is mixed in the fat phase, almost immediately a distinct fish taste is observed. When the iron is mixed in the aqueous phase samples stored at 5 and 10° C. develop after 10 to 14 weeks a fishy off-taste. However at higher temperatures after 3 weeks an off-taste was observed (15° C.) or even almost immediately (25° C.).

Mixing in the water-continuous pre-mix gives better results, however after 17 and 12 weeks an off-taste is observed at 5 and 10° C. respectively. But also at higher temperatures already after 3 weeks an off-taste was observed (15° C.) or even almost immediately (25° C.).

When the iron was mixed after the water-in-oil emulsion was formed the iron particles are distributed in-homogenously over the water phase and after 24 weeks the products stored at 5° C. and 10° C. did not show any off-taste. At 15° C. only after 23 weeks a slight off-taste was observed.

Handmixed samples (table 4) and premix samples (table 3) were prepared with different amounts of iron pyrophosphate mixed in and then tasted as described above. The amount of iron is indicated in % RDA per 20 grams of spread; 100% RDA of iron is 14 mg.

TABLE 5 results of storage tests different amounts of % RDA iron; water-continuous premix.

| Amount of Iron | 5° C. | 10° C. |
|---|---|---|
| 0 | 24 | 24 |
| 30% RDA | 17 | 14 |
| 50% RDA | 17 | 3 |
| 70% RDA | 11 | 8 |
| 100% RDA | 8 | 2-3 |

TABLE 6 results of storage tests different amounts of % RDA iron; handmixed (fat-continuous).

| Amount of Iron | 5° C. | 10° C. | 15° C. |
|---|---|---|---|
| 0 | 24 | 24 | 24 |
| 30% RDA | 24 | 24 | 23 |
| 50% RDA | 24 | 24 | 19 |
| 70% RDA | 24 | 24 | 18 |
| 100% RDA | 24 | 24 | 16 |

Even at higher loads of iron (up to 100% RDA in 20 g of spread) the handmixed samples remain very stable up to 24 weeks at 5° C. and 10° C. And even at higher temperatures a shelf life of 16 weeks was obtained for very high loads of iron (100% RDA).

The premix dosed samples give much faster an off-taste the higher the iron dosage, already after 8 weeks at 5° C., and after 2-3 weeks at 10° C. for 100% RDA.

Examples 5-7 and Comparative Example

Ingredients are listed in table 1 and processed as indicated in example 1-4.

The iron pyrophosphate is dosed in the water-continuous emulsion before inversion via C* unit at 1800 rpm (example 5), and mixed after the forming of the fat continuous emulsion via the C2 unit at 250 rpm (example 6) or dosed via a static mixer after the C*-units instead of the C2 unit (example 7).

The static mixer had a length of 2 meters, and a diameter of 10 mm. The mixer was constructed using two 1 meter-long stainless steel tubes, containing a series of baffles.

In the comparative example no iron source was dosed to show the effect of iron.

TABLE 7 results of storage tests different timing of dosing

| | | Storage temperature | | | |
|---|---|---|---|---|---|
| CONTENT | | 5° C. | 10° C. | 15° C. | 25° C. |
| Water-continuous emulsion (C*-unit) | Ex 5 | 14# | 13 | 5 | 2 |
| Fat-continuous emulsion during processing (C2-unit) | Ex 6 | 24 | 16 | 14 | 6 |
| Fat-continuous emulsion after processing (static mixer) | Ex 7 | 24 | 18 | 5 | 3 |
| No iron | comp | 24 | 24 | 24 | 11 |

Off taste observed after indicated number of weeks of storage at indicated temperature after indicated number of weeks no off-taste observed, however sample was not tasted after the indicated number of weeks.

Samples without iron gave no off-taste after 24 weeks at the storage temperature 5-15° C., however even at 25° C. the samples went off after 11 weeks.

When the iron is mixed in a water continuous emulsion (example 5) the samples remain stable for at least 13-14 weeks at low temperature (5-10° C.) but go off at higher temperature after 5 (15° C.) and 2 weeks (25° C.).

Mixing in a fat continuous phase (examples 6 and 7) gave very good results as they are as stable as the samples without iron at storage temperatures of 5° C. Also at 10° C. acceptable shelf lifes are obtained, with the static mixer giving slightly better results (18 weeks vs 16 weeks). The results for higher temperatures are best for the sample with the mixing in-line (C2-unit example 6) as they have 14 and 6 weeks of stable shelf-life at 15 and 25° C. storage temperatures.

The iron distribution of the samples was also checked. Dosing in the water-continuous emulsion gave a homogenous distribution of the iron over the water droplets, with 1-2 iron particles per droplet.

Dosing in the fat-continuous emulsion gave an inhomogeneous distribution of the iron over the water-droplets with the sample with dosing at the C2 unit (example 6) being the most inhomogeneous as only a few water droplets contained iron particles and many iron particles were present in these water droplets.

The mixing with a static mixer (example 7) also gave an inhomogeneous distribution of the iron over the water droplets, however more water droplets contained iron when compared to the samples made by dosing at the C2 unit (example 6) and less iron particles were present per water-droplet than in the samples made by dosing at the C2 unit (example 6).

It should be noted that the iron containing water droplets in example 6 and 7 are distributed homogenous throughout the spread so that on macro-level the iron is distributed evenly and thus when the spreads are being used an even dosage of iron will be obtained, although the iron is distributed in-homogenously over the water-phase.

The invention claimed is:

1. Edible water-in-oil emulsion comprising a source of mineral and 15 to 95 wt % fat; wherein the mineral is a pro-oxidative mineral; wherein the mineral is present in the aqueous phase; and wherein the mineral is in-homogenously distributed over the aqueous phase.

2. Edible emulsion according to claim 1 wherein the mineral is present in an amount of 10% to 200% of the RDA per daily serving.

3. Edible emulsion according to claim 1 wherein the amount of fat is between 20 and 85 wt % and wherein the emulsion is a spread.

4. Edible emulsion according to claim 1 wherein the mineral gives an unpleasant taste when the mineral is homogenously distributed over the aqueous phase.

5. Edible emulsion according to claim 1 wherein the mineral is a cationic metal.

6. Edible emulsion according to claim 1 wherein the mineral is a transition metal.

7. Edible emulsion according to claim 1 wherein the mineral is a metal in oxidation state 2+ or 3+.

8. Edible emulsion according to claim 1 wherein the mineral is present in an amount that gives an unpleasant taste when the mineral is homogenously distributed over the aqueous phase.

9. Edible emulsion according to claim 8 and wherein the unpleasant taste is noticed after 15 weeks or less of storage at 10° C.

10. Edible emulsion according to claim 1 wherein the mineral is present in an amount of 30% to 100% of the RDA per serving.

11. Edible emulsion according to claim 1 comprising poly unsaturated fatty acids.

12. Edible emulsion according to claim 1 comprising omega-3 fatty acids.

13. Edible emulsion according to claim 12 comprising 2 to 40 wt % of omega-3 fatty acids on fat phase.

14. Edible emulsion according to claim 12 comprising 30-1500 mg of DHA and/or EPA per daily serving.

15. Process for making an edible emulsion according to claim 1 comprising
   a) preparation of an aqueous phase comprising water soluble ingredients without the mineral
   b) preparation of a fat phase with fat soluble ingredients
   c) mixing the aqueous phase and fat phase
   d) forming a water-in-oil emulsion
   e) mixing in the mineral after the water-in-oil emulsion is formed.

16. Process according to claim 15 wherein the edible emulsion is fat continuous and comprises poly unsaturated fatty acids.

17. Process according to claim 15 wherein the mixing step e) is carried out with a hand-mixer, a static mixer or in a pin-stirrer.

18. Process according to claim 15 wherein the mixing step e) is carried out at a mixing speed of less than 500 RPM.

* * * * *